United States Patent [19]

Zandveld

[11] 3,868,647

[45] Feb. 25, 1975

[54] ELIMINATION OF TRANSIENT ERRORS IN A DATA PROCESSING SYSTEM BY CLOCK CONTROL

[75] Inventor: Frederik Zandveld, Beekbergen, Netherlands

[73] Assignee: U.S. Philips Corporation, New York, N.Y.

[22] Filed: May 16, 1973

[21] Appl. No.: 360,833

[30] Foreign Application Priority Data

May 27, 1972 Netherlands .......................... 7207216

[52] U.S. Cl. .......................... 340/172.5, 235/153 R

[51] Int. Cl. .......................... G06f 1/04

[58] Field of Search ....... 340/172.5, 146.1; 235/153

[56] References Cited

UNITED STATES PATENTS 3,453,601 7/1969 Bogert et al. .................... 340/172.5

3,623,017 11/1971 Lowell et al. .................... 340/172.5

*Primary Examiner*—Raulfe B. Zache

*Attorney, Agent, or Firm*—Frank R. Trifari; Gerald H. Kiel

[57] ABSTRACT

A repeat is performed in a computer system after detection of an error in the operation, the circumstances then being changed as much as possible. The clock frequency is then decreased by the selective blocking of a part of the clock pulses, so that second clock pulse cycles are produced which are composed of the same but wider spaced clock pulses. All functions remain possible duringthe second clock pulse cycles, be it at a lower speed. The circumstances can be further modified yet by first completely stopping the computer system for a given period of time, or by erasing the information sorted in a foreground store.

6 Claims, 4 Drawing Figures

ELIMINATION OF TRANSIENT ERRORS IN A DATA PROCESSING SYSTEM BY CLOCK CONTROL

The invention relates to a data processing system, comprising a control unit, a clock by means of which clock pulses can be generated, and a data processor which can be controlled by clock pulses and which comprises an error detector, it being possible to reset the control unit to an already passed position under the control of an error signal from the error detector, after which the data processor can be restarted by a restarting signal. Errors which are liable to occur in a data processing system are distinguished as "solid" errors and "transient" errorss. If an error occurs during an operation, the system is restarted, solid errors then appearing in exactly the same way: these errors must then be repaired, for example, by replacement of an element of the system. Transient errors no longer appear after one or more restarts. By restarting the system when an error is detected, the transient errors can be repaired as if it were, so that the system becomes defective less often. A system of this kind is known, for example, from U.S. Pat. No. 3,533,065. This specification describes inter alia a number of methods of avoiding loss of information upon restarting. The invention, however, does not relate to the operation of the error detector.

The boundary between solid and transient errors is not very well defined, and the invention has for its object to perform the restarting in a manner such that as few transient errors as possible appear as solid errors. This can be effected by changing the internal circumstances in the system, because transient errors are often produced by undesired mutual influencing of system components. Examples of these circumstances are the temperature, the supply voltage and the slope of signal pulses which itself, moreover, can be dependent again of, for example, temperature and supply voltage. Further circumstances can be external disturbance signals, own mutual influencing (cross-talk) and combinations of these and others. If the circumstances are unfavourable, errors can appear in that tolerances are exceeded as regards delay times of given electrical signals, switching speeds of flipflops and the like.

So as to eliminate many transient errors in a simple manner, the invention is characterized in that with the restarting signal the control unit can generate an intermediate signal under the control of which clock pulses can be generated for a given period of time by the clock, the said clock pulses having a repetition time which exceeds that of the clock pulses generated prior to the appearance of the error signal. Many errors appear because insufficient time is available for a given function in given circumstances. This is notably the case for transient errors. By temporarily increasing the reptition time of the clock pulses, many of these transient errors are avoided. The system continues to operate at full speed after termination of the intermediate signal.

One aspect of the invention is that the data processing system comprises a clock which can generate clock pulse cycles, the intermediate signal being capable of alternately blocking and allowing passage of clock pulses during an integer number of clock pulse cycles, so as to form second cycles of clock pulses which are composed of corresponding clock pulses and which have a longer duration. It was found that few additional switching elements are required for this purpose, and the change-over from the high to the low repetition frequency is thus also effected without difficulty.

According to the one aspect of the invention, a cycle consists of *n* clock pulses, the intermediate signal being capable of alternately allowing passage of one clock pulse and blocking *kn* clock pulses (*k* 32 1, 2, . . .) during a (*kn*30 1)-multiple of said cycles. *n* usually has the value 2 or 4. Such a second, slower cycle then has a duration of 3 or 5 normal cycles for $k = 1$; for $k = 2$:5 or 9 of such cycles, respectively. Each clock pulse allowed to pass is followed by a large interval. Consequently, it is ensured that sufficient time is available for all functions, even if the circuit involved in this function does not operate very well. Moreover, the structure of the clock pulses which are allowed to pass is very simple viewed in time.

Another aspect of the invention is that third cycles of clock pulses can be derived from the blocking signals formed from the intermediate signal. As a result, the shape, for example, the length of the pulses acting as clock pulses can also be influenced. Consequently, another circumstance yet is changed in order to avoid transient errors.

A further aspect yet of the invention is that a delay element is provided which receives the error signal and which generated the restarting signal after a predetermined delay, it being possible to block the clock pulses between the error signal and the restarting signal. This predetermined time can be set to cover a large number of clock pulse cycles; in that case it is likely that all sorts of circumstances have changed in a favourable sense; for example, external disturbances or switch-on phenomena have terminated. It is known from U.S. Pat. No. 3,548,177 to block clock pulses in reaction to an error signal which indicates whether an error is to be expected during the next clock pulse cycle. Restarting is then performed in the state in which the part of the system known to the operator was when the error signal appeared. Because the error detector supplies an error signal already if a future error is liable to occur, no information is destroyed. On the other hand, the margin for the appearance of the error signal must be chosen to be very wide. This is because it will often depend on the information whether an error occurs. Assume that a binary 1 is represented by a pulse, and a binary 0 is represented by the absence of a pulse. If a disturbance decreases the pulse level, this can be noticed in the case of a 1, but not in the case of a 0. If the disturbance consists of a pulse, the 0 can be unduly considered as a 1, but the pulse associated with a 1 is then increased, whch is not objectionable. The requirement that no information may be destroyed is too severed in many cases; this is certainly the case if operations are performed on information which is fetched from a fast (foreground) store, whiles the same information is also present in a slower main store, for example, in a magnetic ring core store. The delay incurred according to said U.S. Pat. No. 3,548,177 is then certainly inadmissibly large. However, the said anticipation by the error signal can also be dispensed with. Part of the treatment of the information must then be repeated. This can be effected by resetting the control unit to a position which it has already passed, for example, in that it comprises a program counter which counts down over a given traject. It may then be that the circumstances (temperature, supply voltage etc.) have changed so little during the repeat that the same error occurs which initially caused the error signal. Chances are then very high that the (transient) error is recognized as a solid error, so that a breakdown is signalled. This also is very time-consuming. A favourable compromise is reached by waiting before restarting.

If the data processor comprises a foreground store and a main store, it is a further aspect of the invention that the information of the foreground store can be erased in reaction to said error signal. After the erasing of the information, the same information which will be required again can be fetched from the main store. The information stored in a foreground store will then usually arrive in a different location in said store. A foreground store containing a small number of incorrect bit locations can thus still be used with reasonable results, particularly because usually not all information stored is used again: a single error is not too important then.

The invention will be described in detail with reference to some figures.

Figure 1:
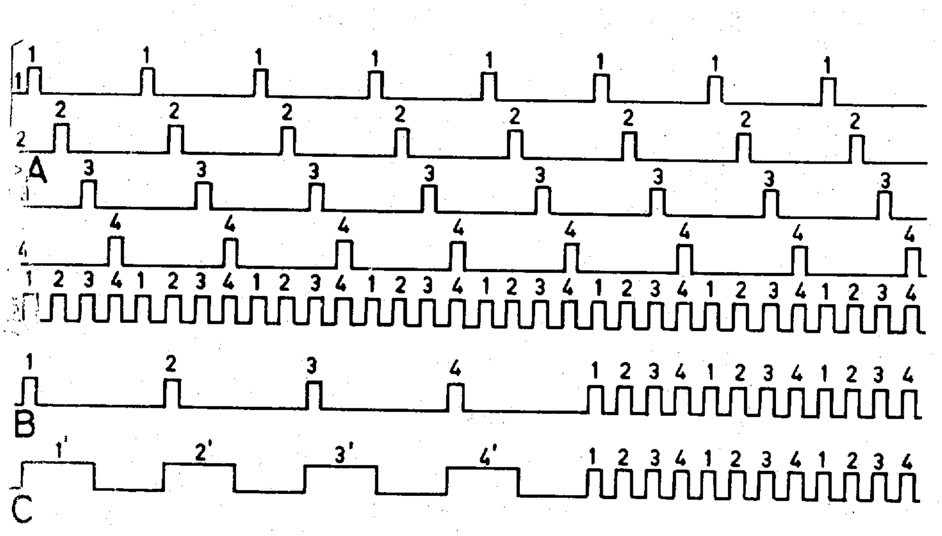
FIG. 1 shows a number of clock pulse diagrams according to the invention in the case of four clock pulses per cycle.

FIG. 1 shows a number of clock pulse diagrams according to the invention for four clock pulses per cycle. The four clock pulses of a cycle always appear sequentially on the associated clock pulse lines. FIGS. 1A 1–4 give an idea thereof. In FIG. 1A5 the clock pulses are combined in one diagram so as to obtain a more compact view. The pulses retain their original numbering so that, for example, a 3 signifies that one of the pulses of FIG. 1A3 is concerned. FIG. 1B shows a restarting procedure (again shown in one diagram). At the beginning, the normal course of events is terminated by the error signal. The restarting signal can now be directly generated, but also after a given delay: this effect is not shown in FIG. 1B. A typical value for the delay is, for example, 0.1–0.01 sec. According to FIG. 1B, each time one clock pulse is allowed to pass, after which each time four clock pulses are blocked. Afer five cycles according to FIG. 1A5, exactly one second cycle of clock pulses has been formed. After one or more of such second cycles, the intermediate signal is terminated and all clock pulses are allowed to pass. Each clock pulse allowed to pass during the presence of the intermediate signal is always followed by an interval of a complete cycle in which transient errors have substantially no possibility of becoming manifest.

According to FIG. 1C, longer pulses are formed from the clock pulses which are allowed to pass during the intermediate signal in FIG. 1B: th pulses 1', 2', 3', 4'. This can be effected by means of known logic circuits. Instead of the procedure of FIG. 1B, other combinations of pulses can alternatively be blocked or be allowed to pass. This can offer advantages in given cases.

Figure 2:
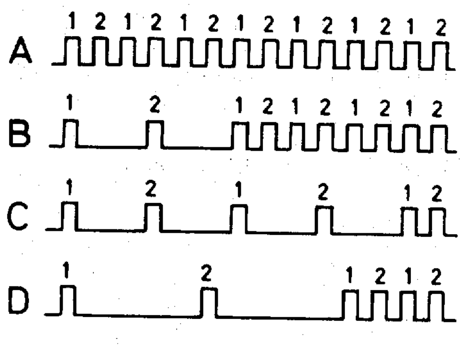
FIG. 2 shows clock pulse diagrams for two clock pulses per cycle.
Figure 3:
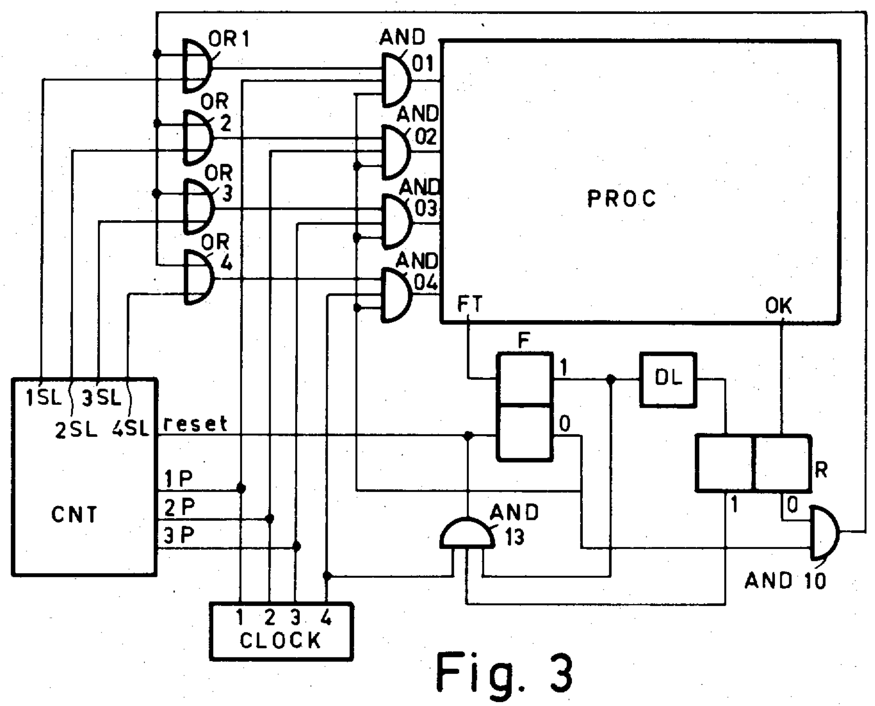
FIG. 3 shows a block diagram of a device for realizing the diagram of FIG. 1B.

FIG. 2 shows some examples of a cycle consisting of two clock pulses. FIG. 2A corresponds to FIG. 1A. FIG. 2B corresponds to FIG. 1B. In FIG. 2C the intermediate signal is present twice as long as in FIG. 2B. In FIG. 2D each time two consecutive cycles of two clock pulses are blocked after one clock pulse has been allowed to pass. The period during which the intermediate signal is present may be different. If an error appeared, for example, during a multiplication operation, the entire multiplication operation can be repeated with the second cycles of clock pulses of longer duration. This is because, particularly if a substantial delay is incorporated before the appearance of the restarting signal, this delay constitutes the largest loss of time anyway. Moreover, the restarting procedure commences at a "restartable" point, for example, at the beginning of the arithmetic operation in which the error appeared. This point can sometimes lie back a great many clock pulse cycles, for example, in the case of a division or another complex operation as many as 100 clock pulse cycles. A great many cycles will then often be very "slowly" completed.

FIG. 3 shows a block diagram of a device according to the invention, comprising a clock CLOCK, a processor PROC, a control unit CNT, two bistable elements F and R, a delay element DL, six logic AND-gates AND 01, 02, 03, 04, 10 and 13 and four logic OR-gates OR 1 . . . 4.

There are four modes of operation which are controlled by the states of the bistable elements F and R. In the normal state, the bistable elements F and R are in the 0 -state, with the result that the 0 -outputs are high (logic value 1). As a result, the logic AND-gate AND 10 receives two high signals. The resultant high output signal of AND 10 is applied, via the logic OR-gates OR 1 . . . 4, to the logic AND-gates AND 01 . . . 04, which are prepared by two high signals to allow passage of the positive clock pulses of the clock CLOCK. Under the control thereof the processor PROC operates at full speed. The processor PROC comprises means for detecting an error; such means are known per se and will not be described in this context. If an error is detected, a positive pulse appears on the output FT of the processor PROC, with the result that the bistable element F is set to the 1 -state: the 0 -output thereof now becomes low, so that the logic AND-gates AND 01 . . . 04 are blocked. The signal on the 1 -output of the bistable element F is applied to the bistable element R after having been delayed by the delay element DL, with the result that the bistable element R is also set to the 1 -state. The logic AND-gate AND 13 then receives the high signals from the 1 -outputs of the bistable elements F and R. The clock CLOCK now continuously supplies clock pulses which will be blocked for the time being. This is characteristic of the described waiting situation of typically 0.1 to 0.01 second before (slow) restarting. However, after the bistable element R has been set to the 1 -state, the next 4 -clock pulse reaches the logic AND-gate AND 13, with the result that the latter receives three high signals and thus supplies a pulse which acts as a reset pulse. As a result, the bistable element F is reset to the 0 -state. Moreover, the reset pulse is applied to the control unit CNT which also receives the 1, 2 and 3-clock pulses. The restarting signal is then present (bistable element F is in the "zero" state, but the intermediate signal is also present still (the bistable elements F and R are not 1), with the result that the control unit CNT alternately opens and blocks the logic AND-gates AND 01 . . . 04 via the logic OR-gates OR 1 . . . 4. When the process has passed the original error situation without difficulty, the processor PROC indicates, by means of the signal OK, that operation at full speed is allowed once more..This signal OK is also used as the reset signal for the bistable element R.

Figure 4:
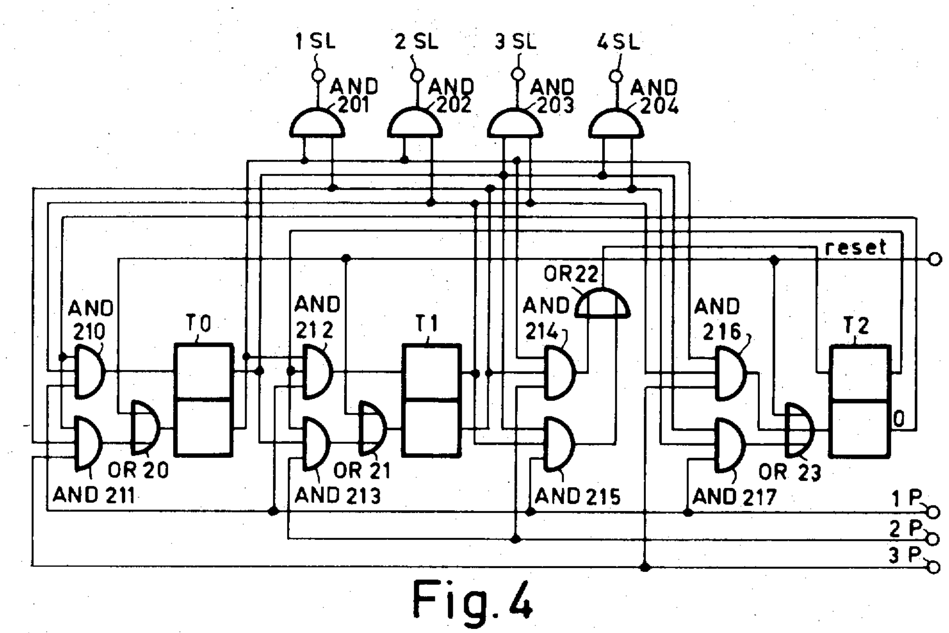
FIG. 4 shows a block diagram of a data control unit.

According to FIG. 4, the control unit CNT comprises three bistable elements T0, T1, T2, twelve logic AND-gates AND 201, 202, 203, 204, 210, 211, 212, 213, 214, 215, 216, 217, and four logic OR-gates OR 20, 21, 22, 23. The control unit CNT can furthermore comprise a variety of components, for example, a program counter, control registers and the like, but it is alternatively possible that these components are accommodated in the processor PROC or elsewhere. The control unit CNT receives the reset pulse from the logic AND-gate AND 13. As a result, the bistable elements T0, T1, and T2 are set to the 0 -state via the logic OR-gates OR 20, 21 and 23. Consequently, the logic AND-gate AND 201 receives two high signals (as the only one of the gates AND 201 . . . 204), with the result that the logic AND-gate AND 01 of FIG. 3 is prepared by the signal on the output 1SL to pass the next 1 -clock pulse. The next 2 -clock pulse actuates the logic AND-gate AND 214 which for the remainder receives the same signal as the logic AND-gate AND 201, thus setting the bistable element T2 to the 1 -state via the logic OR-gate OR 22.

The subsequent 3-clock pulse and 4-clock pulse have no further consequences. The next 1-clock pulse is allowed to pass by the logic AND-gate 212 because this gate receives signals from the 1-output of the bistable element T2 and from the 0-output of the bistable element T0. As a result, the bistable element T1 is set to the 1 -state. The logic AND-gate AND 202 now receives, as the only one of the gates AND 202 . . . 204, two high signals with the result that, via the logic OR-gate OR 2, the logic AND-gate AND 02 is prepared to pass the next 2-clock pulse. In reaction to the next 3-clock pulse, the logic AND-gate AND 216 also receives the signals from the 0-output of the bistable element T0 and from the 1-output of the bistable element T1. Via the logic OR-gate OR 23, the bistable element T2 is then reset to the 0-state again. Nothing happens in reaction to the next 4-clock pulse. In reaction to the next 1-clock pulse, the logic AND-gate AND 210 receives high signals from the 1-output of the bistable element T1 and from the 0-output of the bistable element T2, with the result that the bistable element T0 is set to the 1 -state. Nothing happens in reaction to the next 2-clock pulse. In reaction to the next 3-clock pulse, the clock pulse is applied to the processor PROC(FIG. 3) by way of the high signals on the 1-outputs of the bistable elements T0 and T1 and hence via the logic OR-gate OR 3, nothing happens in reaction to the next 4-clock pulse. In reaction to the next 1-clock pulse, the logic AND-gate AND 215 receives three high signals, notably also from the 1-outputs of the bistable elements T0 and T1. Via the logic OR-gate OR 22, the bistable element T2 is then set to the 1 -state again.

In reaction to the next 2-clock pulse, the logic AND-gate AND 213 receives three high signals, notably also from the 1 -outputs of the bistable elements T0 and T2. Via the logic OR-gate OR 21, the bistable element T1 is then reset to the 0-state. Nothing happens in reaction to the next 3-clock pulse. In reaction to the next 4-clock pulse, the logic AND-gate AND 204 receives high signals from the 1-output of the bistable elements T0 and from the 0-output of the bistable element T1, so that via the logic OR-gate OR 4 the logic AND-gate AND 04 is prepared to allow passage. In reaction to the next 1-clock pulse, the logic AND-gate AND 217 receives three high signals by way of further high signals from the 1-output of the bistable element T0 and the 0-output of the bistable element T1. The bistable element T2 is then reset as yet to the 0 -state via the logic OR-gate OR 23. Nothing happens in reaction to the next 2-clock pulse. In reaction to the next 3-clock pulse, the logic AND-gate AND 211 receives three high signals, notably also from the 0-outputs of the bistable elements T1 and T2. The bistable elements T0 is then reset to the 0-state via the logic OR-gate OR 20. Nothing happens in reaction to the next 4-clock pulse.

| Clock Pulse | State T0 T1 T2 | Function |
|---|---|---|
| 1 | 000 | 1-clock pulse allowed to pass |
| 2 | 001 | — |
| 3 | | — |
| 4 | | — |
| 1 | 011 | — |
| 2 | | 2-clock pulse allowed to pass |
| 3 | 010 | — |
| 4 | | — |
| 1 | 110 | — |
| 2 | | — |
| 3 | | 3-clock pulse allowed to pass |
| 4 | | — |
| 1 | 111 | — |
| 2 | 101 | — |
| 3 | | — |
| 4 | | 4-clock pulse allowed to pass |
| 1 | 100 | — |
| 2 | | — |
| 3 | 000 | — |
| 4 | | — |

The above Table indicates in reaction to which clock pulses the state of the relevant bistable elements changes, and in reaction to which clock pulses the processor PROC receives a clock pulse. After five normal clock pulse cycles, one second clock pulse cycle is generated and the control unit CNT has reached its initial position again. Finally, the processor PROC supplied an OK signal, with the result that the bistable element R is reset to the 0-state (FIG. 3); the logic AND-gate AND 10 then receives two high signals, with the result that the normal cycles can recommence. This may be the end of a cycle, but this is not necessarily so. The lines extending between FIG. 3 and the control unit CNT (FIG. 4) are each time correspondingly denoted.

The information in foreground stores (not shown) can be erased either by the error signal (FT) or by the reset signal. The refilling of such stores with information is known per se. For example, the first clock pulse cycles after restarting can be exclusively used for this purpose. The resetting of the processor PROC to an already passed position can also be contolled by one of these signals. It is alternatively possible that the processor PROc resets itself.

What is claimed is:

1. In a data processing system having a control unit, a clock for generating clock pulses and a data processor which is controlled by said clock pulses and wherein the data processor also comprises an error detector for detecting processing errors, said system also including means to reset the control unit to a prior operational position by control of an error signal generated by the error detector and means internal to the control unit to restart the data processor by an appropriate restart signal, the improvement comprising means responsive to the error signal for generating an intermediate signal in addition to the restart signal, and means responsive to said intermediate signal and responsive to the clock for generating clock pulses having a repetition time which exceeds that of the clock pulses provided prior to the appearance of the error signal, whereby the processor may be operated at the faster clock rate so that transient processing errors may be avoided.

2. A data processing system as claimed in claim 1, wherein a delay element is provided responsive to the error signal for generating the restarting signal after a predetermined delay, and means being provided for blocking the clock pulses between the error signal and the restarting signal.

3. A data processing system as claimed in claim 1, including a foreground store and a main store which cooperate with said control unit and processor, wherein the information of the foreground store can be erased in response to said error signal.

4. In a data processing system having a control unit, a clock for generating clock pulses and a data processor which is controlled by said clock pulses and wherein the data processor also comprises an error detector for detecting processing errors, said system also including means to reset the control unit to a prior operational position by control of an error signal generated by the error detector and means internal to the control unit to restart the data processor by an appropriate restart signal, the improvement comprising means responsive to the error signal for generating an intermediate signal in addition to the restart signal, and means responsive to said intermediate signal and responsive to the clock for generating clock pulses and wherein the clock includes means for generating cycles of clock pulses, and means responsive to said intermediate signal for alternately blocking and allowing passage of clock pulses during an integer number of clock pulse cycles so as to form a second cycle of clock pulses which are composed of corresponding clock pulses and which have a longer duration.

5. A data processing system as claimed in claim 4, in which a cycle consists of $n$ clock pulses, and wherein during a $(kn+1)$-multiple of said cycles alternately one clock pulse can be allowed to pass by the intermediate signal and $kn$ clock-pulses can be blocked (where $k=1,2\ldots$).

6. A data processing system as claimed in claim 4, including means for developing third cycles of clock pulses responsive to blocking signals formed from the intermediate signal.

* * * * *

PO-1050
(5/69)

UNITED STATES PATENT OFFICE
CERTIFICATE OF CORRECTION

Patent No. 3868647 Dated February 25, 1975

Inventor(s) Frederik Zandveld

It is certified that error appears in the above-identified patent and that said Letters Patent are hereby corrected as shown below:

In the Abstract, line 8, "duringthe" should be --during the--

Col. 2, line 8, change "k32 1,2,..." to --k = 1, 2,...--

Col. 2, line 9, change "kn30 1" to --kn + 1--

Col. 3, line 57, delete "th" and insert --the--

Col. 6, line 56, change "PROc" to --PROC--

Signed and Sealed this

*twenty-ninth* Day of *July 1975*

[SEAL]

*Attest:*

RUTH C. MASON
*Attesting Officer*

C. MARSHALL DANN
*Commissioner of Patents and Trademarks*